United States Patent
Seo

(10) Patent No.: US 9,945,307 B2
(45) Date of Patent: Apr. 17, 2018

(54) METHOD AND SYSTEM FOR IMPROVING CHANGE OF FUEL IN BI-FUEL VEHICLE

(71) Applicants: HYUNDAI MOTOR COMPANY, Seoul (KR); Kia Motors Corporation, Seoul (KR)

(72) Inventor: Yoo Jin Seo, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 296 days.

(21) Appl. No.: 14/681,973

(22) Filed: Apr. 8, 2015

(65) Prior Publication Data
US 2016/0138497 A1 May 19, 2016

(30) Foreign Application Priority Data
Nov. 14, 2014 (KR) .................. 10-2014-0158624

(51) Int. Cl.
*F02D 41/00* (2006.01)

(52) U.S. Cl.
CPC ...... *F02D 41/0025* (2013.01); *F02D 41/0027* (2013.01); *F02D 2200/0602* (2013.01); *Y02T 10/36* (2013.01)

(58) Field of Classification Search
CPC ........ F02D 19/00; F02D 19/02; F02D 19/026; F02D 19/06; F02D 41/0025; F02D 41/0027; F02D 2200/0602
USPC .................... 701/101, 102, 103, 104, 105
See application file for complete search history.

(56) References Cited

U.S. PATENT DOCUMENTS

| 8,447,495 | B2* | 5/2013 | Pearce ............ B60K 15/03504 123/516 |
| 9,328,677 | B2* | 5/2016 | Leone ................. F02D 41/0027 |
| 9,334,813 | B2* | 5/2016 | Fiveland ............ F02D 19/0626 |
| 2002/0194911 | A1* | 12/2002 | Allegre ............... G01F 23/2927 73/293 |

(Continued)

FOREIGN PATENT DOCUMENTS

| JP | H06-193480 A | 7/1994 |
| JP | 2004-270604 A | 9/2004 |

(Continued)

OTHER PUBLICATIONS

Korean Office Action dated Dec. 3, 2015 issued in Korean Patent Application No. 10-2014-0158624.

*Primary Examiner* — Grant Moubry
(74) *Attorney, Agent, or Firm* — McDermott Will & Emery LLP

(57) ABSTRACT

A method for improving a change of fuel in a bi-fuel vehicle includes: a step of measuring an LPG level in an LPG fuel tank; a pressure reference driving step of continuing the driving of the vehicle using the LPG fuel; a pressure change rate reference driving step of continuing the driving of the vehicle using the LPG fuel when it is determined that the vehicle may be driven by the LPG fuel by comparing an LPG rail pressure change quantity and a pressure change quantity in the LPG fuel tank with a set reference value; and a fuel expanding step of continuing the driving of the vehicle using the LPG fuel when it is determined that the vehicle may be driven by the LPG fuel by comparing an injection quantity of LPG fuel and an accumulated value of mileage with a set reference value.

6 Claims, 3 Drawing Sheets

(56) References Cited

U.S. PATENT DOCUMENTS

| | | | |
|---|---|---|---|
| 2009/0088950 A1* | 4/2009 | Fisher .................. | F02D 31/002 |
| | | | 701/103 |
| 2013/0220274 A1* | 8/2013 | Deshpande ........... | F02D 19/105 |
| | | | 123/350 |
| 2013/0238226 A1* | 9/2013 | Slaymaker ............ | F02D 41/065 |
| | | | 701/113 |

FOREIGN PATENT DOCUMENTS

| JP | 2005-240675 A | 9/2005 |
|---|---|---|
| JP | 2013-113268 A | 6/2013 |
| KR | 10-2010-0125909 A | 12/2010 |
| KR | 10-2011-0036229 A | 4/2011 |
| KR | 10-2012-0092998 A | 8/2012 |

* cited by examiner

METHOD AND SYSTEM FOR IMPROVING CHANGE OF FUEL IN BI-FUEL VEHICLE

CROSS REFERENCE TO RELATED APPLICATION

The present application claims priority to Korean Patent Application Number 10-2014-0158624, filed on Nov. 14, 2014 in the Korean Intellectual Property Office, the entire contents of which application are incorporated herein in its entirety by reference.

BACKGROUND OF THE INVENTION

1. Technical Field

The present invention relates to a method and a system for improving a change of fuel in a bi-fuel vehicle, and more particularly, to a technology of greatly increasing a driving distance of a vehicle using LPG fuel and enabling a vehicle to be driven using LPG fuel by measuring a fuel pressure even when a level sensor measuring an LPG level in an LPG fuel tank is out of order.

2. Description of the Related Art

Generally, a bi-fuel vehicle represents a vehicle which uses different kinds of fuel such as gasoline/diesel-liquefied petroleum gas (LPG)/compressed natural gas (CNG) to generate power.

The bi-fuel vehicle essentially requires a system which may use all of the different kinds of fuel. For example, a vehicle using a combination of gasoline-LPG needs to include both of a gasoline fuel system for supplying general gasoline fuel to an engine and an LPG fuel system such as a vaporizer, a mixer, an LPG fuel tank (Bombe), and the like which are required to use LPG fuel.

Meanwhile, the bi-fuel vehicle using the gasoline-LPG M fuel may perform both of a manual change of fuel by driver's will and an automatic change of fuel at the time of a lack of fuel.

However, since a driver prefers to use cheaper LPG fuel than gasoline, he/she expects to completely consume the LPG fuel until the LPG fuel is under a measurable range.

However, the driver may not use LPG fuel at his/her desire level. Generally, an engine controller which is equipped in a vehicle permits the use of LPG fuel only within a range which may be measured by the level sensor in the LPG fuel tank in consideration of a safety problem of engine stalling while driving and performs a change of fuel to gasoline when the measured level of LPG fuel reaches a slight tolerance within the measurable range.

Therefore, an object of the present invention is to provide a method and a system for improving a change of fuel in a bi-fuel vehicle capable of increasing a distance which may be actually stably driven by only LPG fuel than that of the related art by measuring an LPG rail pressure and a pressure in an LPG fuel tank in addition to a level sensor in an LPG fuel tank and maximally using cheap LPG fuel by driving a vehicle using mixed fuel of gasoline and LPG in consideration of an actual injection quantity of LPG fuel and a mileage when it is determined that it is difficult to drive a vehicle using only the LPG fuel.

The contents described as the related art have been provided only for assisting in the understanding for the background of the present invention and should not be considered as corresponding to the related art known to those skilled in the art.

SUMMARY OF THE INVENTION

An object of the present invention is to provide a method and a system for improving a change of fuel in a bi-fuel vehicle capable of maximally increasing utilization of cheap LPG fuel.

Disclosed herein is a method for improving a change of fuel in a bi-fuel vehicle.

According to an exemplary embodiment of the present invention, a method for improving a change of fuel in a bi-fuel vehicle may include: a step of measuring an LPG level in an LPG fuel tank and when it is determined that the LPG level is smaller than a first reference value, continuing driving of the vehicle using LPG fuel; a pressure reference driving step of continuing the driving of the vehicle using the LPG fuel when it is determined that the vehicle may be driven by the LPG fuel by comparing an LPG rail pressure and a pressure in an LPG fuel tank with second and third reference values, respectively; a pressure change rate reference driving step of continuing the driving of the vehicle using the LPG fuel when M it is determined that the vehicle may be driven by the LPG fuel by comparing an LPG rail pressure change quantity and a pressure change quantity in the LPG fuel tank with fourth and fifth reference values, respectively; and a fuel expanding step of continuing the driving of the vehicle using the LPG fuel when it is determined that the vehicle may be driven by the LPG fuel by comparing an injection quantity of LPG fuel and an accumulated value of mileage with sixth and seventh reference values, respectively.

In the pressure reference driving step, when the LPG rail pressure is equal to or less than a set second reference value or the pressure in the LPG fuel tank is equal to or less than a set third reference value, the vehicle may be driven by changing fuel to gasoline fuel.

In the pressure change rate reference driving step, when the LPG rail pressure change quantity is larger than a set fourth reference value or the pressure change quantity in the LPG fuel tank is larger than a set fifth reference value, the vehicle may be driven by changing fuel to gasoline fuel.

When the LPG level is smaller than the first reverence value, a warning light may be lit up to call a driver's attention and the injection quantity of LPG fuel and a mileage may be stored after the warning light is lit up.

In the fuel expanding step, when the injection quantity of LPG fuel is larger than the sixth reference value or the accumulated value of mileage is larger than the seventh reference value, the vehicle may be driven by changing fuel to a mixed fuel of LPG and gasoline.

At the time of changing fuel in a vehicle to the mixed fuel of gasoline and LPG, the ratio of gasoline in the mixed fuel of LPG and gasoline may be increased to a constant ratio in consideration of the injection quantity of LPG fuel.

Disclosed herein is a system for improving a change of fuel in a bi-fuel vehicle.

According to another exemplary embodiment of the present invention, a system for improving a change of fuel in a bi-fuel vehicle may include: a level sensor configured to measure an LPG level in an LPG fuel tank; an LPG rail pressure sensor configured to be installed at an LPG rail side to measure a pressure of LPG fuel flowing along the rail; an LPG tank pressure sensor configured to measure the pressure in the LPG fuel tank; and a fuel change controller configured to control whether to open and close an LPG injector and a gasoline injector by measuring an LPG level measured by the level sensor, the LPG rail pressure measured by the LPG rail pressure sensor, and the LPG tank pressure measured by the LPG tank pressure sensor and then comparing the measured LPG level, LPG rail pressure, and LPG tank pressure with a pre-stored reference value.

The fuel change controller may control a vehicle to be driven using the mixed fuel by storing the injection quantity of LPG fuel and the accumulated value of mileage in real time and simultaneously opening the LPG injector and the gasoline injector when the injection quantity of LPG fuel and the accumulated value of mileage are larger than the set reference value.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

A method and a system for improving a change of fuel in a bi-fuel vehicle according to exemplary embodiments of the present invention will be described with reference to the accompanying drawings.

Figure 1:
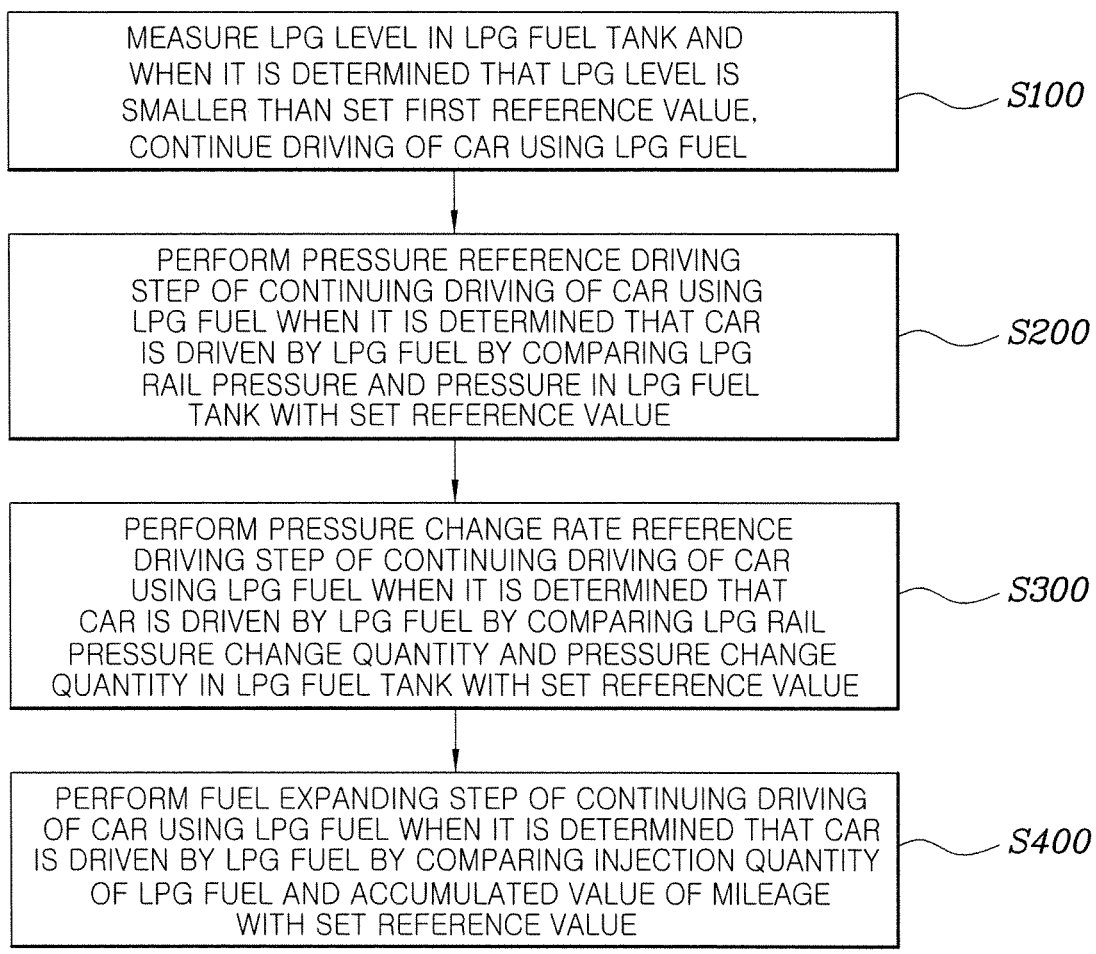
FIG. 1 is an overall flow chart of a method for improving a change of fuel in a bi-fuel vehicle according to an exemplary embodiment of the present invention.
Figure 2:
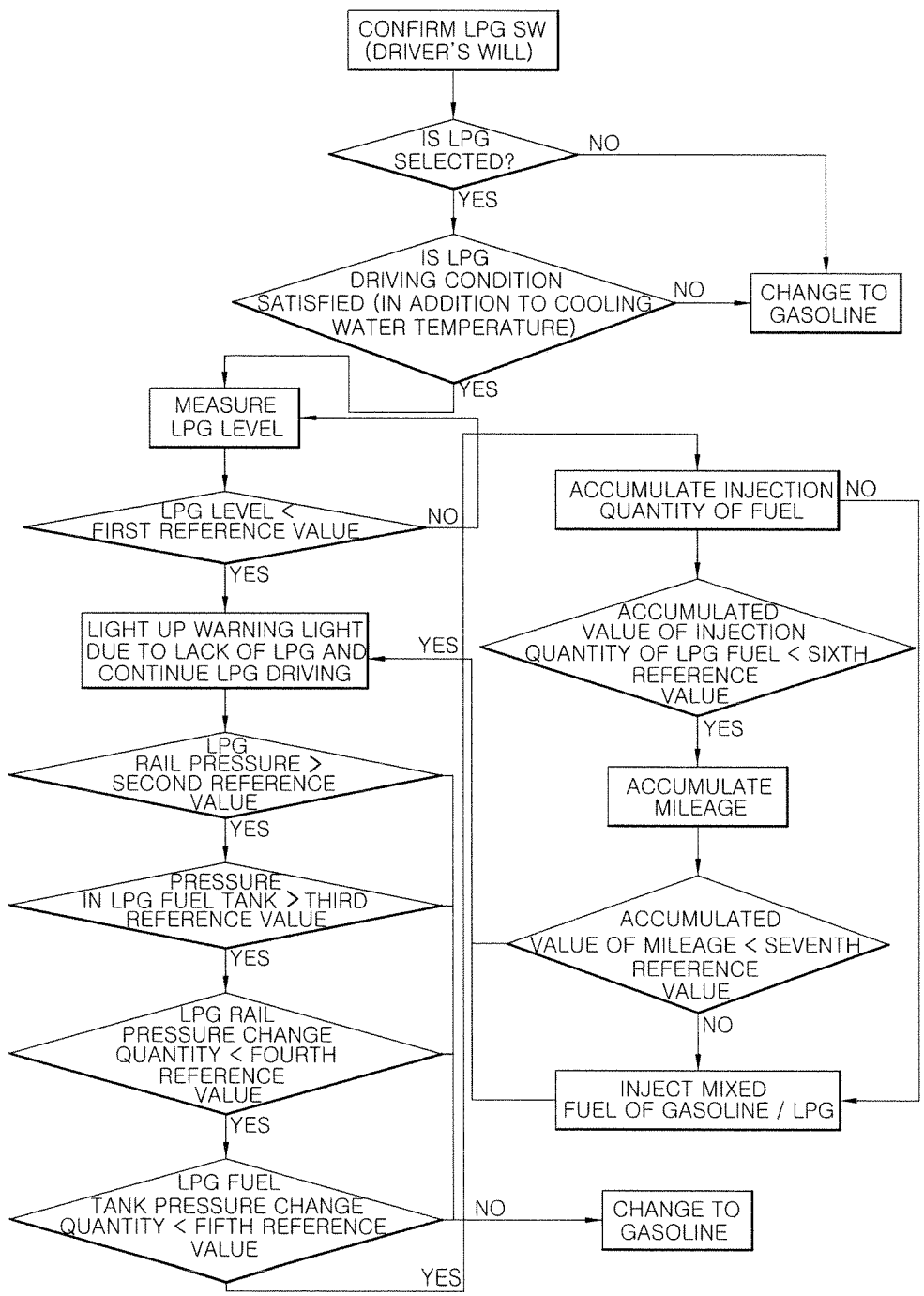
FIG. 2 is a flow chart illustrating in detail an overall process of the present invention.

FIG. 1 is an overall flow chart of a method for improving a change of fuel in a bi-fuel vehicle according to an exemplary embodiment of the present invention and FIG. 2 is a flow chart illustrating in detail an overall process of the present invention. As illustrated, the method for improving a change of fuel in a bi-fuel vehicle according to the exemplary embodiment of the present invention includes: a step of measuring an LPG level in an LPG fuel tank and when it is determined that the LPG level is smaller than a set first reference value, continuing driving of the vehicle using LPG fuel (S100); a pressure reference driving step (S200) of continuing the driving of the vehicle using the LPG fuel when it is determined that the vehicle may be driven by the LPG fuel by comparing an LPG rail pressure and a pressure in an LPG fuel tank with a set reference value; a pressure change rate reference driving step (S300) of continuing the driving of the vehicle using the LPG fuel when it is determined that the vehicle may be driven by the LPG fuel by comparing an LPG rail pressure change quantity and a pressure change quantity in the LPG fuel tank with a set reference value; and a fuel expanding step (S400) of continuing the driving of the vehicle using the LPG fuel when it is determined that the vehicle may be driven by the LPG fuel by comparing an injection quantity of LPG fuel and an accumulated value of mileage with a set M reference value.

That is, the method for improving a change of fuel in a bi-fuel vehicle according to the exemplary embodiment of the present invention performs the above steps to continue the driving of the vehicle using only the LPG fuel when it is determined that the vehicle may be sufficiently driven by only the LPG fuel and then maximally use cheap LPG fuel as compared with the related art by continuing the driving of the vehicle using mixed fuel of LPG and gasoline so as to prevent drivability aggravation, for example, engine rattling, engine stalling, and the like, and then gradually increasing a ratio of gasoline.

The detailed step will be described below.

First, the step of measuring the LPG level in the LPG fuel tank and when it is determined that the LPG level is smaller than the set first reference value, continuing the driving of the vehicle using the LPG fuel are performed.

The set first reference value is a numerical value which is preset by a vehicle driving test and means a minimum value which may be measured by a level sensor installed in the LPG fuel tank.

Prior to the above step, as illustrated in FIG. 2, a switch on state which allows a driver to drive a vehicle using the LPG by his/her own will is first confirmed and the above step is performed while the vehicle is driven by LPG.

As described above, when the LPG level is smaller than the set first reference value, a warning light which indicates the lack of LPG fuel when the vehicle driving is continued by the LPG fuel is lit up to call a driver's attention.

Meanwhile, the pressure of LPG fuel supplied to the engine side is measured by the LPG rail pressure sensor installed on the rail supplied with LPG fuel while the vehicle driving is continued by the LPG fuel and the pressure of supplying LPG fuel and the pressure of stored LPG fuel are sensed in real time by using the LPG tank pressure sensor measuring the pressure of LPG fuel in the LPG fuel tank.

Next, the pressure reference driving step of determining whether the vehicle may be driven only by the current LPG fuel inconsideration of the pressure on the rail and the pressure in the tank is performed.

Describing in detail, when the LPG rail pressure is larger than a set second reference value and the pressure in the LPG fuel tank is larger than a set third reference value, the pressure of the stored LPG fuel and the pressure of the supplying LPG fuel determine that the vehicle may be driven only by the LPG fuel. In this case, the vehicle driving is continued only by the LPG fuel.

On the other hand, when the LPG rail pressure is smaller than the set second reference value or the pressure in the LPG fuel tank is smaller than the set third reference value, it is determined that the vehicle may not be driven only by the LPG fuel to change fuel in the vehicle to the gasoline fuel.

Meanwhile, the method for improving a change of fuel in a bi-fuel vehicle according to the exemplary embodiment of the present invention performs the pressure change rate reference driving step of first measuring the pressure of the LPG fuel on the rail and the pressure of the LPG fuel in the tank to maximally use the cheap LPG fuel even after it is determined whether the vehicle may be driven only by the LPG fuel.

That is, the vehicle driving is continued by the LPG fuel when the vehicle may be driven by the LPG fuel by comparing the LPG rail pressure change quantity and the pressure change quantity in the LPG fuel tank with the set reference value, which will be described below in detail.

When the LPG rail pressure change quantity is smaller than a set fourth reference value and the pressure change quantity in the LPG fuel tank is smaller than a set fifth reference value, it is determined that the vehicle may be still driven only by the LPG fuel and thus the vehicle driving is continued only by the LPG fuel.

On the other hand, when the LPG rail pressure change quantity is larger than the set fourth reference value or the pressure change quantity in the LPG fuel tank is larger than the set fifth reference value, it is determined that the vehicle may not be driven only by the LPG fuel to change fuel in a vehicle to the gasoline fuel.

The exemplary embodiment of the present invention may improve fuel efficiency by continuing the vehicle driving only by the cheap LPG fuel in consideration of the pressure and the pressure change rate of LPG fuel.

Meanwhile, as described above, the exemplary embodiment of the present invention may consider an injection quantity of LPG fuel and a mileage of the LPG fuel and then induce the use of mixed fuel of LPG and gasoline so as to still prove the efficient use of the LPG fuel even after the pressure and the pressure change rate of LPG fuel are considered.

That is, the vehicle driving is continued by the LPG fuel when the vehicle may be driven by the LPG fuel by comparing the injection quantity of LPG fuel and the accumulated value of mileage with the set reference value.

In this case, in the measuring of the LPG level in the LPG fuel tank and the continuing of the vehicle driving by the LPG fuel when the LPG level is smaller than the set first reference value, the warning light which indicates the lack of LPG fuel is lit up to call the driver's attention. The injection quantity of LPG fuel supplied to the engine side and the mileage which is the driving distance of the vehicle after the warning light is lit up are stored in the storage unit to be described below in real time and then the injection quantity of LPG fuel and the mileage are determined and then it is determined whether to continue the vehicle driving by the mixed fuel of LPG and gasoline.

That is, when the injection quantity of LPG fuel is smaller than a set sixth reference value or the accumulated value of mileage is smaller than a set seventh reference value, it is determined that it is difficult to drive a vehicle only by the LPG fuel to change fuel in a vehicle to the mixed fuel of LPG and gasoline.

In this case, when the fuel in a vehicle is changed to the mixed fuel of LPG and gasoline, the ratio of gasoline in the mixed fuel of LPG and gasoline is increased to a constant ratio in consideration of the injection quantity of LPG fuel.

By the above process, the present invention may use the LPG fuel or the mixed fuel of LPG and gasoline even when the level sensor in the LPG tank is out of order and use all the LPG stored in the LPG fuel tank, thereby increasing the driving distance of the vehicle only by the LPG fuel.

Figure 3:
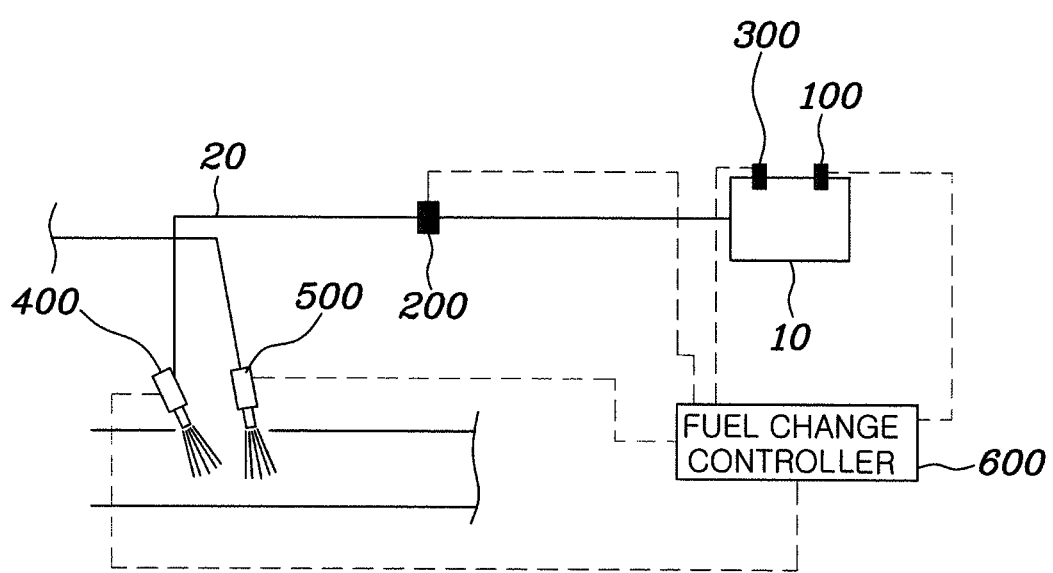
FIG. 3 is a schematic configuration diagram of a system for improving a change of fuel in a bi-fuel vehicle according to an exemplary embodiment of the present invention.

Meanwhile, FIG. 3 is a schematic configuration diagram of a system for improving a change of fuel in a bi-fuel vehicle according to an exemplary embodiment of the present invention. As illustrated in FIG. 3, the system for improving a change of fuel in a bi-fuel vehicle includes a level sensor 100 configured to measure an LPG level in an LPG fuel tank, an LPG rail pressure sensor 200 configured to be installed at an LPG rail side to measure a pressure of LPG fuel flowing along the rail, an LPG tank pressure sensor 300 configured to measure the pressure in the LPG fuel tank, and a fuel change controller 600 configured to control whether to open and close an LPG injector 400 and a gasoline injector 500 by measuring an LPG level measured by the level sensor 100, the LPG rail pressure measured by the LPG rail pressure sensor 200, and the LPG tank pressure measured by the LPG tank pressure sensor 300 and then comparing the measured LPG level, LPG rail pressure, and LPG tank pressure with a pre-stored reference value.

Further, the fuel change controller 600 controls a vehicle to be driven using the mixed fuel by storing the injection quantity of LPG fuel and the accumulated value of mileage in real time and simultaneously opening the LPG injector 400 and the gasoline injector 500 when the injection quantity of LPG fuel and the accumulated value of mileage are larger than the set reference value.

According to the method and the system for improving a change of fuel in a bi-fuel vehicle in accordance with the exemplary embodiments of the present invention configured as described above, it is possible to increase a driving distance of a vehicle using cheap LPG fuel and more increase the utilization of LPG fuel than the related art by injecting mixed fuel of LPG and gasoline, and the like when there is a need to prevent drivability aggravation, the engine stalling, and the like.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A method for improving a change of fuel in a bi-fuel vehicle, comprising:
   a step of measuring a liquefied petroleum gas (LPG) level in an LPG fuel tank and when it is determined that the LPG level is smaller than a first reference value, continuing driving of the vehicle using LPG fuel;
   a pressure reference driving step of continuing the driving of the vehicle using the LPG fuel when it is determined that the vehicle is driven by the LPG fuel by comparing an LPG rail pressure and a pressure of the LPG fuel tank with a second reference value and a third reference value, respectively;
   a pressure change rate reference driving step of continuing the driving of the vehicle using the LPG fuel when it is determined that the vehicle is driven by the LPG fuel by comparing an LPG rail pressure change quantity and a pressure change quantity in the LPG fuel tank with a fourth reference value and a fifth reference value, respectively; and
   a fuel expanding step of continuing the driving of the vehicle using the LPG fuel when it is determined that the vehicle is driven by the LPG fuel by comparing an injection quantity of LPG fuel and an accumulated value of mileage with a sixth reference value and a seventh reference value, respectively,
   wherein in the pressure reference driving step, when the LPG rail pressure is equal to or less than the second reference value or the pressure in the LPG fuel tank is equal to or less than the third reference value, the vehicle is driven by changing fuel to gasoline fuel.

2. The method of claim 1, wherein in the pressure change rate reference driving step, when the LPG rail pressure change quantity is larger than the fourth reference value or the pressure change quantity in the LPG fuel tank is larger than the fifth reference value, the vehicle is driven by changing fuel to gasoline fuel.

3. The method of claim 1, wherein when the LPG level is smaller than the first reverence value, a warning light is lit up to call a driver's attention and the injection quantity of LPG fuel and a mileage are stored after the warning light is lit up.

4. The method of claim 1, wherein in the fuel expanding step, when the injection quantity of LPG fuel is larger than the sixth reference value or the accumulated value of mileage is larger than the seventh reference value, the vehicle is driven by changing fuel to a mixed fuel of LPG and gasoline.

5. The method of claim 4, wherein at the time of changing fuel in the vehicle to the mixed fuel of gasoline and LPG, the ratio of gasoline in the mixed fuel of LPG and gasoline is increased to a constant ratio in consideration of the injection quantity of LPG fuel.

6. A method for improving a change of fuel in a bi-fuel vehicle, comprising steps of:
- driving the vehicle using a liquefied petroleum gas (LPG) fuel, when an LPG level of a LPG fuel tank is less than a first reference value;
- continuing driving the vehicle using the LPG fuel, when an LPG rail pressure and a pressure of the LPG fuel tank are greater than a second reference value and a third reference value, respectively;
- continuing driving the vehicle using the LPG fuel, when a change of the LPG rail pressure and a change of the pressure of the LPG fuel tank are less than a fourth reference value and a fifth reference value, respectively; and
- continuing driving the vehicle using the LPG fuel, when an injection quantity of the LPG fuel and an accumulated mileage are less than a sixth reference value and a seventh reference value, respectively,
- wherein, when the LPG rail pressure is equal to or less than the second reference value or the pressure in the LPG fuel tank is equal to or less than the third reference value, the vehicle is driven by changing fuel to gasoline fuel.

* * * * *